United States Patent
Cruzada

(10) Patent No.: US 11,845,548 B2
(45) Date of Patent: Dec. 19, 2023

(54) JET POWERED PERSONAL FLYING MACHINE WITH CUSTOMIZABLE FRAMEWORK AND A SINGLE CONTROL STICK, ATTACHED AT THE FRONT AND CENTER OF THE BASE FRAME

(71) Applicant: Nazareno Cruzada, San Marcos, CA (US)

(72) Inventor: Nazareno Cruzada, San Marcos, CA (US)

( * ) Notice: Subject to any disclaimer, the term of this patent is extended or adjusted under 35 U.S.C. 154(b) by 13 days.

(21) Appl. No.: 17/361,842

(22) Filed: Jun. 29, 2021

(65) Prior Publication Data

US 2022/0411049 A1 Dec. 29, 2022

(51) Int. Cl.
*B64C 39/02* (2023.01)

(52) U.S. Cl.
CPC .................. *B64C 39/026* (2013.01)

(58) Field of Classification Search
CPC ... B64C 39/026; B64C 29/0033; B64C 29/00; B64C 29/0075; B64C 15/02; B64C 15/12; B63B 34/15; B63B 34/21; B63B 34/20; B63B 34/22; B63B 34/23
See application file for complete search history.

(56) References Cited

U.S. PATENT DOCUMENTS

| | | | |
|---|---|---|---|
| 4,189,019 A * | 2/1980 | Zech | B63H 7/02 180/7.4 |
| 4,447,024 A | 5/1984 | Williams | |
| 6,488,232 B2 | 12/2002 | Moshier | |
| 6,969,027 B2 * | 11/2005 | Ishiba | B64C 27/20 244/23 C |
| 8,408,488 B2 | 4/2013 | Leaver | |
| 10,239,615 B2 | 3/2019 | Duru | |
| 10,464,671 B2 | 11/2019 | Duru | |

(Continued)

FOREIGN PATENT DOCUMENTS

| | | | | |
|---|---|---|---|---|
| EP | 2610173 A1 * | 7/2013 | ............. | B64C 25/52 |
| WO | WO-9965768 A1 * | 12/1999 | ............. | B64C 27/06 |
| WO | WO-2014195660 A1 * | 12/2014 | ............. | B64C 27/20 |

OTHER PUBLICATIONS

Set Knob Telescopic Tube Lock (H), Testrite Instrument Co., Mar. 1, 2021 https://web.archive.org/web/*/https://www.testriteoem.com/products/round-telescoping-aluminum-tubing-locks/set-knob-telescopic-tube-lock-h (Year: 2021).*

(Continued)

*Primary Examiner* — Richard Green
*Assistant Examiner* — Arfan Y. Sinaki
(74) *Attorney, Agent, or Firm* — DLA PIPER LLP (US)

(57) ABSTRACT

A jet powered personal flying machine composed of a customizable framework consisting of separate bolt-on parts or sections that can be swapped out or switched, including a base frame containing a plurality of mini jet engines, a shell or fuselage, a fuel tank, a flight computer, a plurality of electronic buttons and controls, a parachute, footstands on both sides for the user to place their feet and a single control stick consisting of a metal or carbon fiber tube attached at the front and center of the base, and protruding upwards and slightly forward from the base frame, of which contains electronic buttons and controls for the user to use in flying the machine.

11 Claims, 6 Drawing Sheets

(56) References Cited

U.S. PATENT DOCUMENTS

| | | | |
|---|---|---|---|
| 2002/0170763 A1* | 11/2002 | Townsend | B60L 15/20 |
| | | | 180/220 |
| 2005/0151002 A1* | 7/2005 | Ishiba | B64C 39/026 |
| | | | 244/10 |
| 2006/0054735 A1* | 3/2006 | Li | A63B 35/00 |
| | | | 244/4 A |
| 2014/0374542 A1* | 12/2014 | Li | B63B 34/15 |
| | | | 244/4 A |
| 2019/0161188 A1* | 5/2019 | Zapata | B64C 39/026 |
| 2019/0202559 A1* | 7/2019 | Levy | B64C 11/001 |
| 2021/0171188 A1* | 6/2021 | Charron | B64C 29/0016 |

OTHER PUBLICATIONS

Blain, "Zapata Ezfly: The jet-powered aerial Segway anyone can fly," New Atlas, https://newatlas.com/zapata-ezfly-flying-segway/53044/, Jan. 18, 2018, 14 pages.

* cited by examiner

JET POWERED PERSONAL FLYING MACHINE WITH CUSTOMIZABLE FRAMEWORK AND A SINGLE CONTROL STICK, ATTACHED AT THE FRONT AND CENTER OF THE BASE FRAME

TECHNICAL FIELD

The invention relates to a personal flying machine or aircraft.

BACKGROUND

The prior art of this invention includes personal, one-person Vertical Takeoff and Landing ("VTOL") flying machines such as the following.

The Williams Aerial Systems Platform ("WASP") X-Jet which was developed in the 1970s. The WASSP X-Jet was nicknamed "The Flying Pulpit" because of its cylindrical shape wherein the pilot stood inside it and controlled it using both hands.

The Zapata Ezfly, which is referred to as a "jet-powered aerial Segway" and has a form factor is that of a flat grilled platform with a railing around the pilot and a bar up front. The Zapata Ezfly is flown with both hands similar to the WASP X-Jet.

A "safety flier" described in U.S. Pat. No. 8,408,488, which has a fixed wing and multiple control sticks.

A "personal flight vehicle" described in U.S. Pat. Nos. 10,239,615 and 10,464,671, which does not have a single center located vertical control stick. Instead, the pilot controls the aircraft using legs and feet.

A "single passenger aircraft" described in U.S. Pat. No. 6,488,232, which does not does not have a single center located vertical control stick or a center located base frame. The single passenger aircraft has wheels, engines above the pilot, and is much larger than the jet powered personal flying machine described herein.

None of the flying machines described above have a single center located vertical control stick.

SUMMARY

A jet powered personal flying machine is described here. The jet powered personal flying machine may include a customizable framework of separate bolt-on parts or sections that can be swapped out or switched, including a base containing a collection of jets, a shell or fuselage, a fuel tank, a flight computer, a plurality of electronic buttons and controls, a parachute, footstands on both sides for the user to place their feet. A single control stick made of a metal or carbon fiber tube may be attached at a front and center of the base and may protrude upwards and slightly forward from the base. The single control stick may include electronic buttons and controls for use in flying the machine.

DETAILED DESCRIPTION

Figure 1:
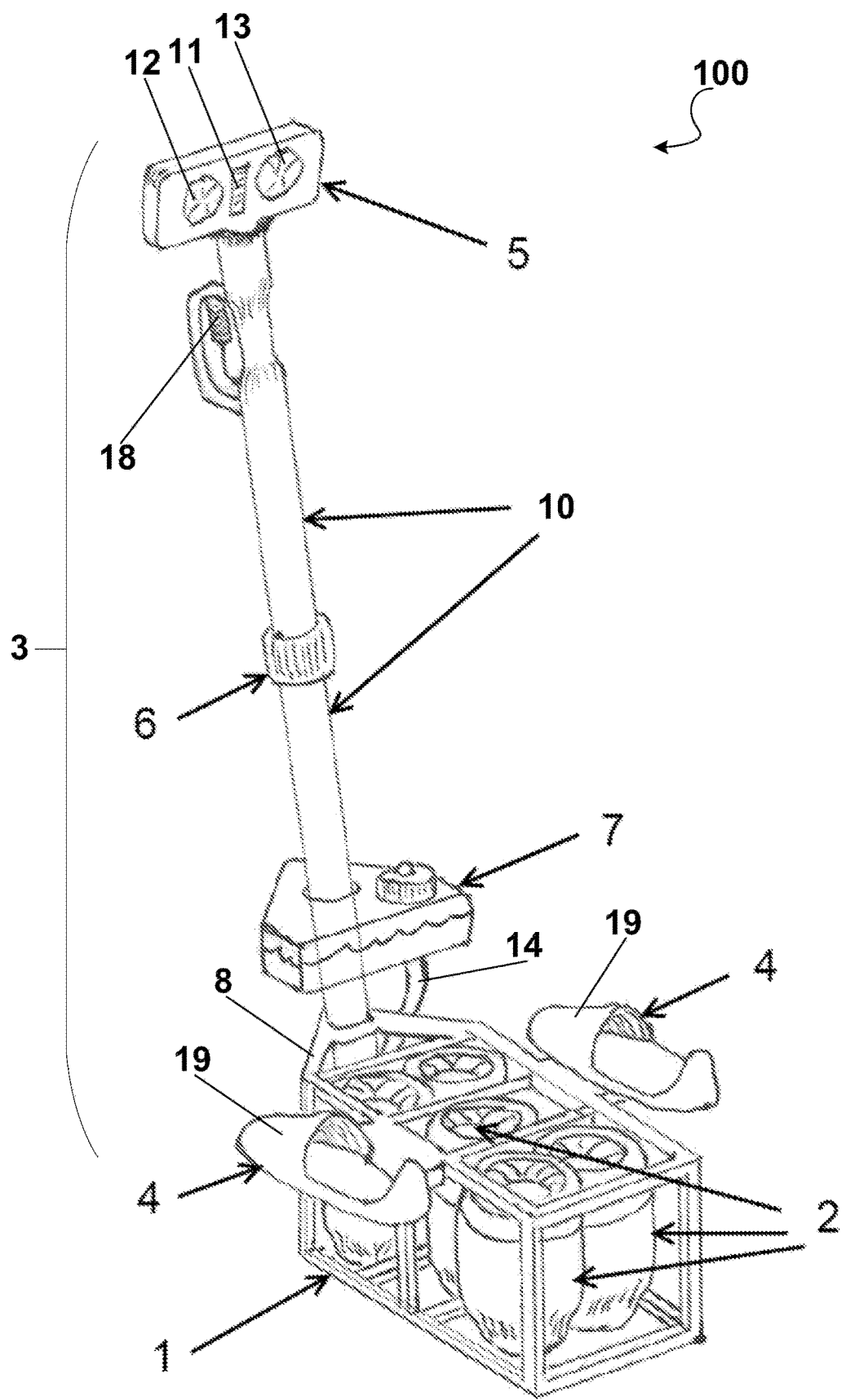
FIG. 1 is a perspective view of a jet powered personal flying machine with a single control stick, according to an example of the present disclosure.

Described herein is a jet powered personal flying machine 100 composed of a customizable framework of separate bolt-on parts or sections that can be swapped out or switched. As shown in FIG. 1, the parts or sections may include:

A base frame 1;
A telescoping control stick 3;
An instrument cluster panel 5;
A plurality of electronic buttons 11 and controls 18;
A plurality of gauges such as a fuel meter 12 and an altimeter 13;
A wiring harness (not shown);
A pair of footstands 4 with straps or foot pockets 19 to secure the pilot's feet;
A plurality of mini jet engines 2;
A plurality of sliding panels 15 that fit into the base frame 1;
A fuel tank 7 and fuel lines 14;
An optional reserve fuel tank (not shown);
A flight and engine management computer (not shown);
An optional parachute (not shown); and
A shell, cowling, fairing or fuselage 17.

The base frame 1 may function as a central component to which the other parts or sections may attach or fasten. Fasteners 9 may include, but are not limited to: bolts, nuts, screws, rivets, glue, welds, etc. The sliding panels 15, to which the mini jet engines 2 may be attached via a clamp or bracket 16, may slide in and out of the base frame 1 to facilitate the installation or removal of the mini jet engines 2. The instrument cluster panel 5 may be located at an upper end of the control stick 3 and may contain buttons 11 such as an on/off button, a horn, and gauges such as a fuel meter 12 and altimeter 13.

Figure 2:
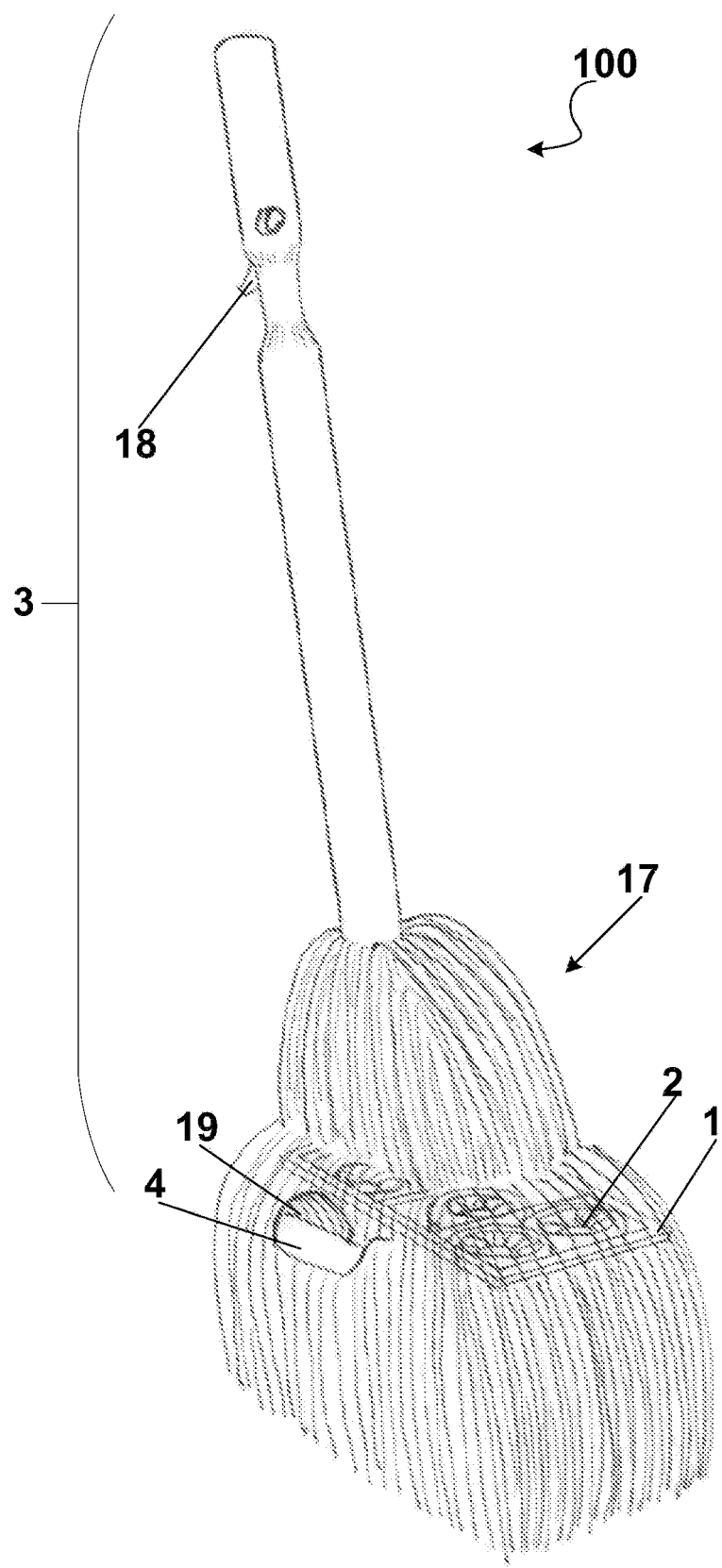
FIG. 2 is a perspective view of the jet powered personal flying machine with a single control stick designed to look like a witch's broom, according to an example of the present disclosure.
Figure 3:
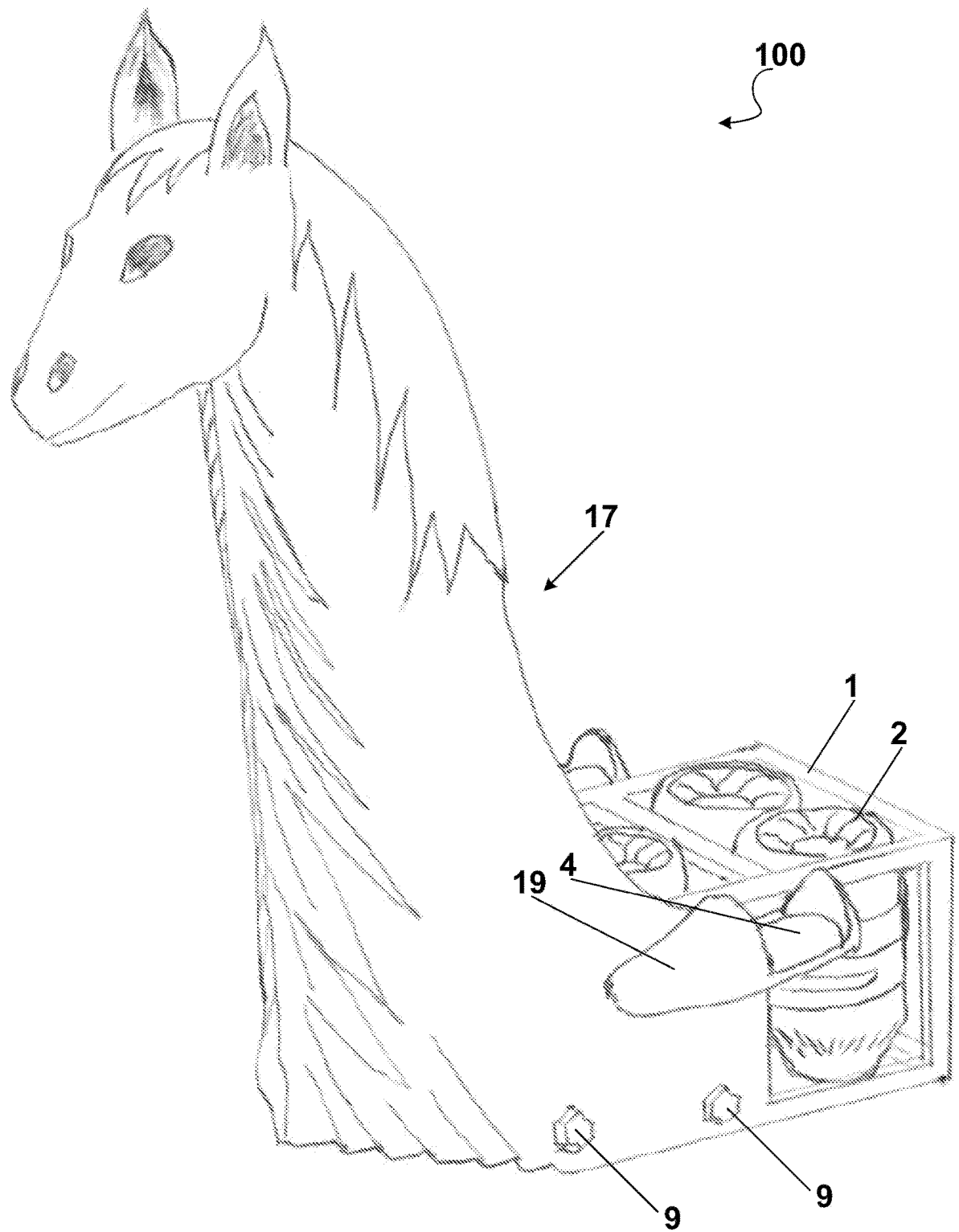
FIG. 3 is a perspective view of the jet powered personal flying machine with a single control stick with a cowling, fairing or fuselage designed to look like a stylized horse, according to an example of the present disclosure.

Bolt-on parts may be swapped out or switched to customize the personal flying machine 100, including the plurality of mini jet engines 2, the fuel tank 7, and the footstands 4. The customizability may allow the construction and configuration of the personal flying machine 100 to be tailored to fit the user or pilot. For example, the shell, cowling, fairing or fuselage 17 may be customized with different shapes, colors, and designs, such as a witch's broom shown in FIG. 2 or a stylized horse shown in FIG. 3.

The shell, cowling, fairing or fuselage 17 may be made of a hard and durable material such as metal, carbon fiber, fiberglass, or plastic and may be attached to cover the base frame 1. In addition, the standard jet engines 2 described below may be replaced with more powerful ones, or instead of the standard configuration of 4-5 jet engines 2, 6-8 jet engines 2 may be installed.

Figure 5A:
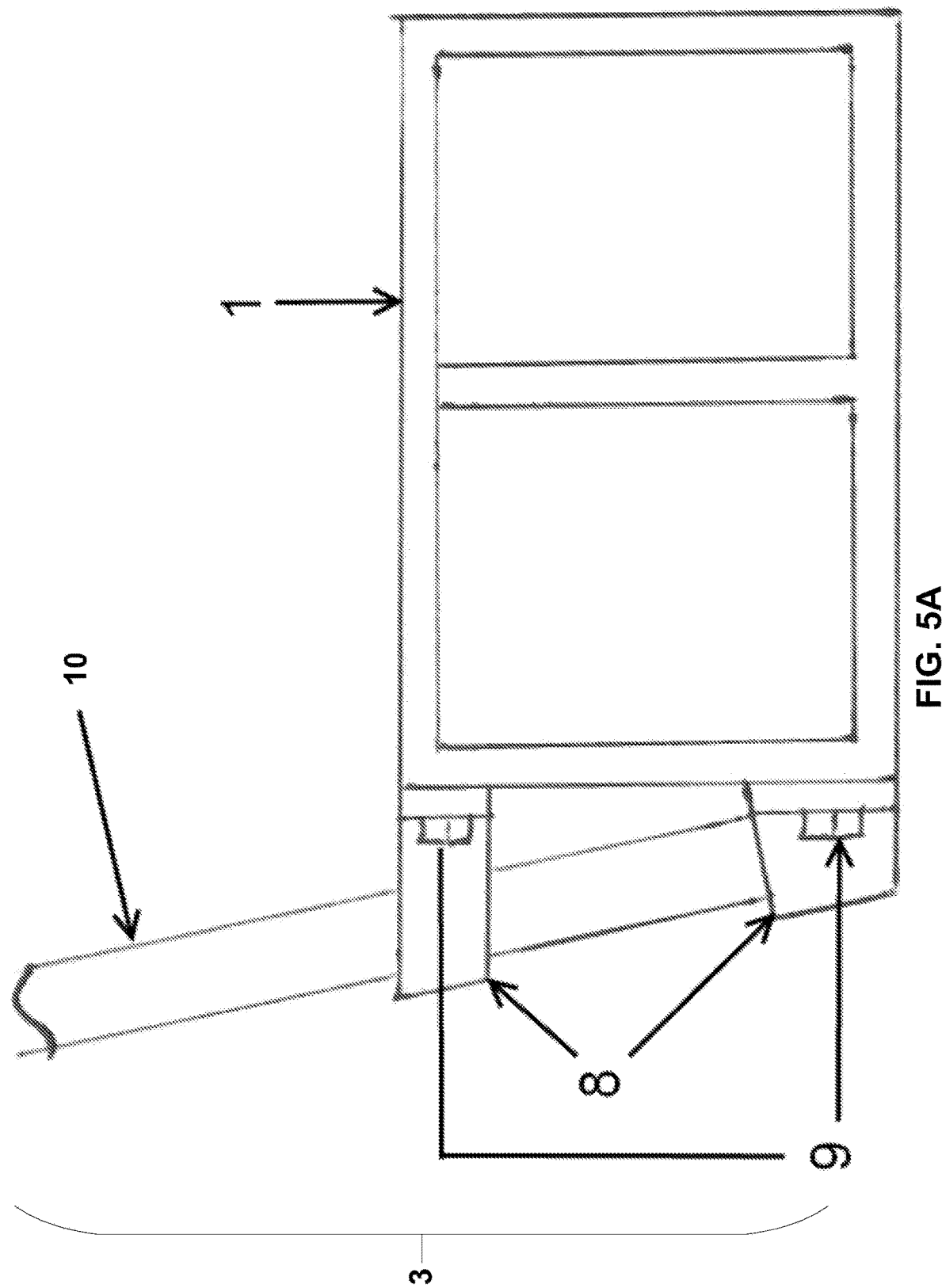
FIG. 5A is a side view of a control stick base mount, according to an example of the present disclosure.
Figure 5B:
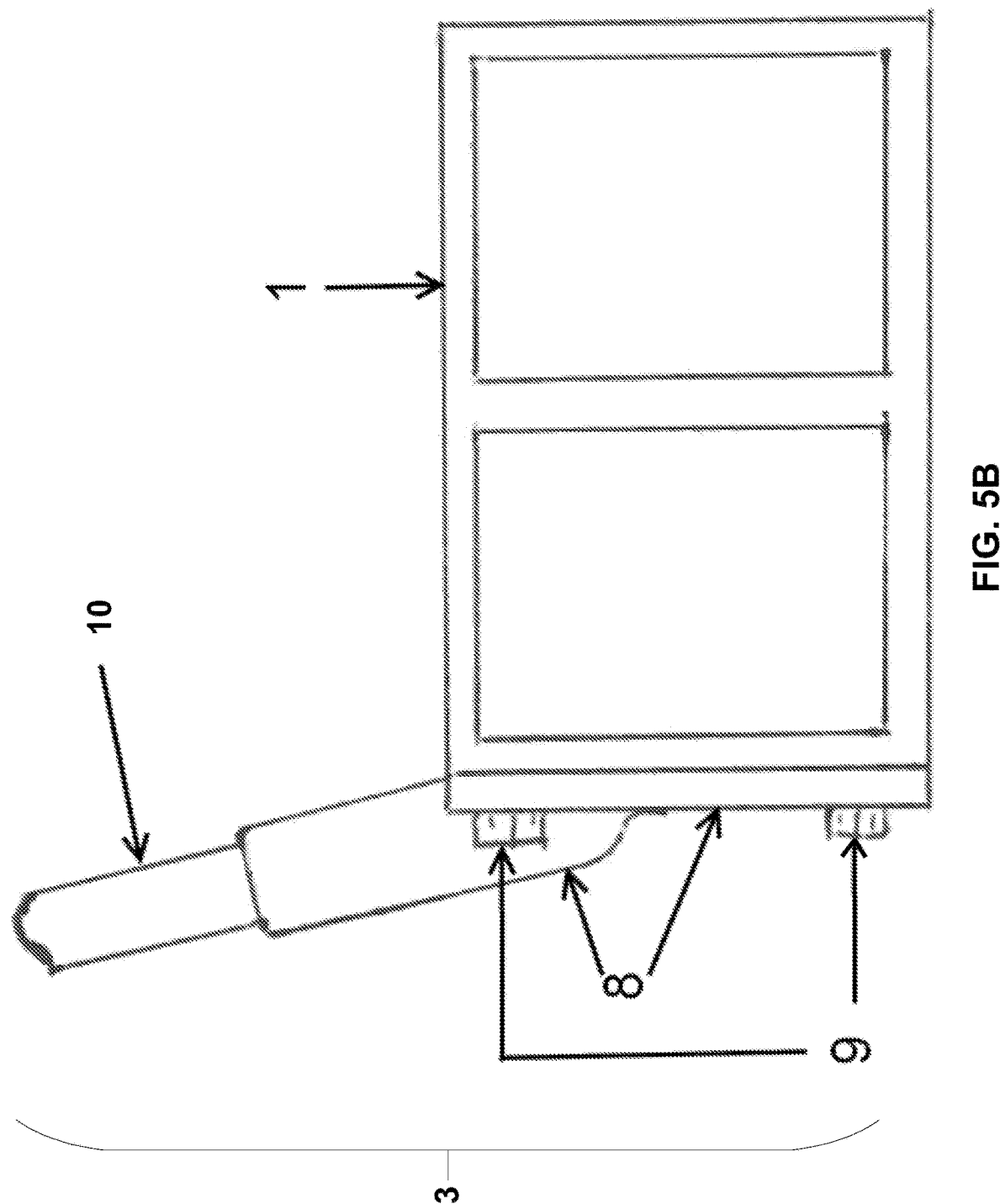
FIG. 5B is a side view of a control stick base mount, according to an example of the present disclosure.

The single, center located, vertically positioned control stick 3 may be one of the unique features of the personal flying machine 100, and may differentiate it from other flying machines. The control stick 3 may consist of a metal or carbon fiber tube 10 attached at the front and center of the base frame 1. The control stick 3 may protrude upwards and slightly forward from the base frame 1 and may include electronic buttons 11 and controls 18 for the user to use in flying the personal flying machine 100. The forward angle of the control stick 3 from the base frame 1 may also vary and may be adjusted. Different examples of base mounts 8, which may be used to attach a tube 10 of the control stick 3 to the base frame 1 at different angles are shown in FIGS. 5A-5B. As shown, the base mount 8 may be attached to the base frame 1 via the fasteners 9.

The control stick 3, along with the footstands 4 located on the left (port) and right (starboard) sides of the base frame 1, may help control the tilt of the base frame 1 and the entire personal flying machine 100. This, in turn, may determine the thrust vector of the jet engines 2. The control stick 3 may include two separate tubes 10, one inside the other, and may have a telescoping ability, which allows it to be shortened or lengthened by adjusting a knob 6. The telescoping adjuster knob 6 may be located where both tubes 10 are joined together and may either tighten or loosen the grip and friction between both tubes 10.

Figure 4:
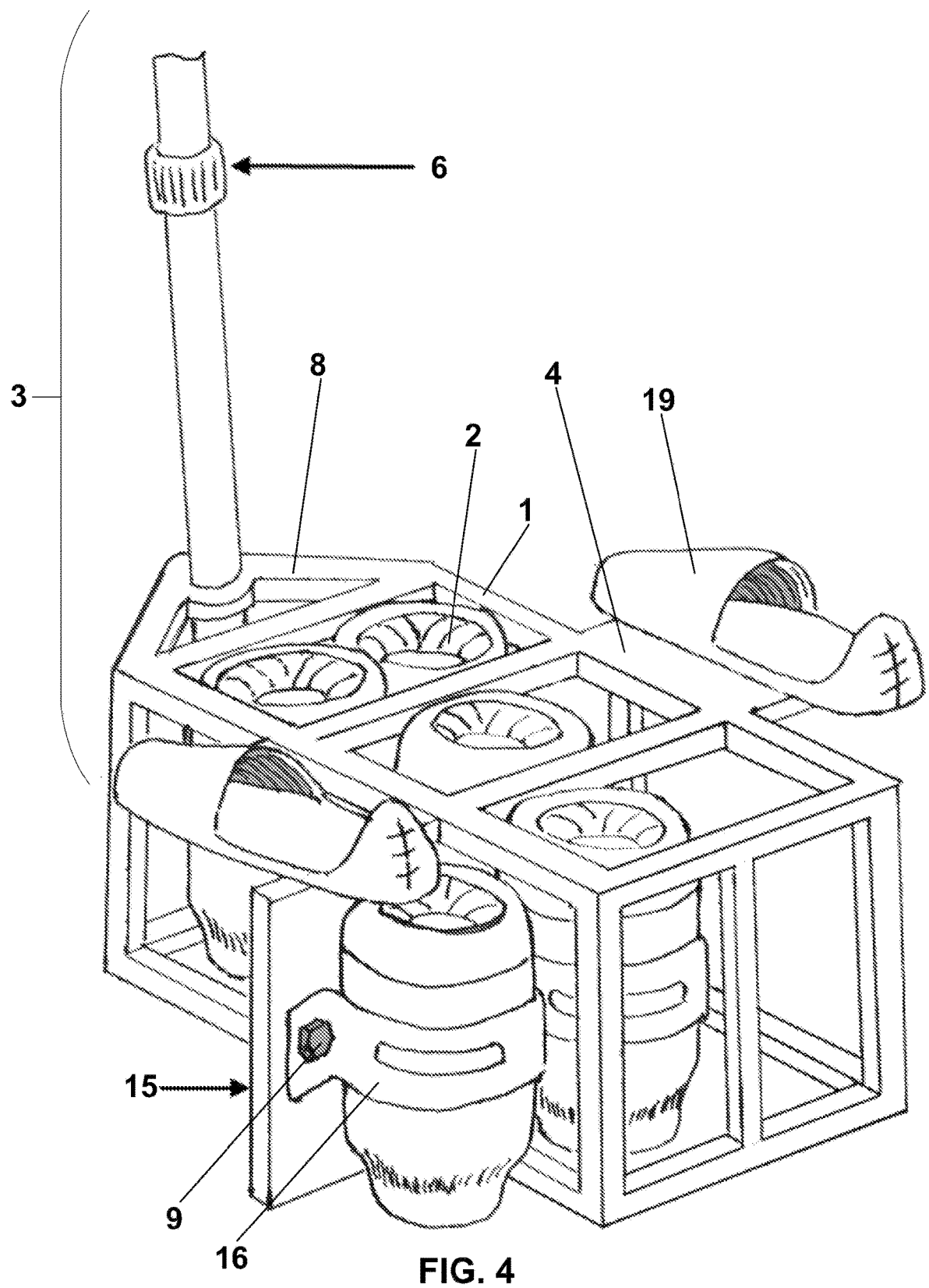
FIG. 4 is a perspective view showing details of a base frame of the jet powered personal flying machine, according to an example of the present disclosure.

As shown in FIG. 4, the pair of footstands 4 on each side of the base frame 1 may function to secure the pilot's feet from moving or shifting. This functionality may be implemented via the use of straps or foot pockets 19 that the pilot's feet may slip into. The foot pockets 19 may be similar to slip-on shoes or moccasins where the pilot can easily slip their feet into them but still have enough grip or friction to hold the pilot's feet in flight. The foot pockets 19 may have the capacity to hold not only bare feet but also feet with shoes on. One of the sliding panels to which some mini jet engines are attached via a clamp or bracket to is shown slid out.

The mini jet engines 2 may be the type used in model airplanes and drones. Examples of the mini jet engines 2 may include JetCat P200-RX and the PBS Aerospace TJ40-G1. In an example, the mini jet engines 2 may be 4-6 inches in diameter and around 10-12 inches in length.

What is claimed is:

1. A jet powered personal flying machine comprising: a base frame configured to be attached to one of a plurality of base mounts; a plurality of mini jet engines within the base frame; and
    a single control stick configured to adjust a tilt of the base frame during flight, the single control stick attached, via a base mount of the plurality of base mounts, to a front face of the base frame forward of the pilot such that the single control stick is located at a centerline of the base frame between a left side and a right side of the base frame and protrudes upwards vertically and at an angle forward from the base frame, the single control stick comprising two separate tubes, one inside the other, such that the single control stick has a telescoping ability allowing the single control stick to be shortened or lengthened by adjusting an adjuster knob that adjusts an amount of grip and friction between the two separate tubes.

2. The jet powered personal flying machine of claim 1, wherein each base mount of the plurality of base mounts is configured to attach the single control stick to the base frame at a different angle.

3. The jet powered personal flying machine of claim 1, further comprising:
    a fuel tank on the single control stick vertically above the base frame.

4. The jet powered personal flying machine of claim 1, further comprising:
    a sliding panel configured to fit into the base frame.

5. The jet powered personal flying machine of claim 4, wherein one or more of the plurality of mini jet engines are attached to the sliding panel.

6. The jet powered personal flying machine of claim 5, wherein the one or more of the plurality of mini jet engines are attached to the sliding panel via one of a clamp and a bracket.

7. The jet powdered personal flying machine of claim 1, further comprising: slip-on footstands extending outwards from the left side and the right side of the base frame.

8. The jet powered personal flying of claim 7, wherein the single control stick and the slip-on footstands are configured to control and maneuver the jet powered personal flying machine during flight.

9. The jet powered personal flying machine of claim 7, wherein the slip-on footstands comprise foot pockets configured to secure a pilot's feet while allowing for the pilot's feet to be slipped in and out.

10. The jet powered personal flying machine of claim 1, further comprising:
    an instrument cluster panel on an upper end of the single control stick, the instrument cluster panel comprising a plurality of electronic buttons, gauges, and controls for the pilot to use during flight.

11. The jet powered personal flying machine of claim 10, wherein the gauges comprise one or more of a fuel meter and an altimeter.

* * * * *